US009083536B2

(12) United States Patent
Russo et al.

(10) Patent No.: US 9,083,536 B2
(45) Date of Patent: Jul. 14, 2015

(54) METHOD OF MONITORING THE POWERING OF A REMOTE DEVICE THROUGH A LAN LINE AND RELATIVE CIRCUIT

(75) Inventors: Riccardo Russo, Milan (IT); Aldo Torazzina, Biassono (IT)

(73) Assignee: STMICROELECTRONICS S.R.L., Agrate Brianza (MB) (IT)

(*) Notice: Subject to any disclaimer, the term of this patent is extended or adjusted under 35 U.S.C. 154(b) by 1029 days.

(21) Appl. No.: 12/601,078

(22) PCT Filed: May 21, 2007

(86) PCT No.: PCT/IT2007/000357
§ 371 (c)(1),
(2), (4) Date: Nov. 20, 2009

(87) PCT Pub. No.: WO2008/142712
PCT Pub. Date: Nov. 27, 2008

(65) Prior Publication Data
US 2010/0162025 A1 Jun. 24, 2010

(51) Int. Cl.
*G06F 1/26* (2006.01)
*H04L 12/10* (2006.01)

(52) U.S. Cl.
CPC . *H04L 12/10* (2013.01); *G06F 1/26* (2013.01)

(58) Field of Classification Search
CPC ......... H04L 12/00; H04L 12/10; H04L 12/28; H04L 49/351; H04L 49/40; G06F 1/24; G06F 1/26; G06F 1/28; G06F 1/30

USPC ......... 713/1, 2, 100, 300, 310, 320–324, 330, 713/340
See application file for complete search history.

(56) References Cited

U.S. PATENT DOCUMENTS

| | | | |
|---|---|---|---|
| 6,448,899 B1 | 9/2002 | Thompson | 340/815.4 |
| 6,986,071 B2 | 1/2006 | Darshan et al. | 713/330 |
| 7,325,147 B2* | 1/2008 | Satoh et al. | 713/300 |
| 2003/0039257 A1* | 2/2003 | Manis et al. | 370/400 |
| 2005/0135280 A1* | 6/2005 | Lam | 370/260 |
| 2006/0168458 A1* | 7/2006 | Stineman et al. | 713/300 |
| 2006/0242458 A1 | 10/2006 | Feldman et al. | 714/14 |
| 2008/0098240 A1* | 4/2008 | Hussain et al. | 713/300 |
| 2008/0136509 A1* | 6/2008 | Timm | 327/558 |

FOREIGN PATENT DOCUMENTS

WO 2006/122184 11/2006 ............. H01L 21/00

* cited by examiner

*Primary Examiner* — Fahmida Rahman
(74) *Attorney, Agent, or Firm* — Allen, Dyer, Doppelt, Milbrath & Gilchrist, P.A.

(57) ABSTRACT

A circuit is for monitoring the powering of a remote device through a LAN without generating an extra biasing voltage higher than the DC power supply voltage. DC voltage used for supplying the remote device is applied to the LAN line while an AC voltage is applied to the line for monitoring whether the remote device is connected to the LAN line. The DC voltage is applied to a first or "high" terminal and the AC voltage is applied to the other or "low" terminal of the LAN line through a decoupling capacitor. This arrangement allows the supplying of the remote device with a large DC voltage compatible with a fully integrated AC signal generator, disconnection detector, and PSE controller, and enhances the reliability of the recognition of whether the powered device is connected to, or disconnected from, the LAN line.

17 Claims, 4 Drawing Sheets

METHOD OF MONITORING THE POWERING OF A REMOTE DEVICE THROUGH A LAN LINE AND RELATIVE CIRCUIT

FIELD OF THE INVENTION

This invention relates to Power over Ethernet technology (PoE), and, more particularly, to a method of monitoring the powering of a device (Remote PD) through the LAN network to which the device is connected, and to a relative circuit that indicates whether or not a DC supply voltage is to be provided to a LAN line.

BACKGROUND OF THE INVENTION

Power over Ethernet (PoE) technology is designed to power devices connected to a multi-channel Ethernet through an Ethernet cable, thus eliminating the need of numerous power plugs for devices such as Web cams, Ip phones, Bluethooth access points, Wlan access points, etc. This technology is standardized by the IEEE802.3af specifications. A Power Sourcing Equipment (PSE) is a device that supplies power through a twisted pair of insulated wires of the multi-wire Ethernet cable to a Powered Device (PD), as depicted in FIG. 1.

The main functions of a PSE are to look for a link to a PD, to detect a PD connected to the LAN, to supply power to the power supply line of the link, to monitor the level of power absorption on the link, and to cut off the supply of power to the link. Normally, the PSE shall cut off power on the link when the PD has been disconnected from the LAN.

A LAN in which a PSE is operating may include not only PDs, but also legacy sockets that are not configured to receive power over the LAN link. In order to prevent damaging legacy equipments by unduly applying a relatively high DC voltage to their LAN connection plugs, the PSE may be able to determine, for each of its power output ports, whether or not an output port is connected to a PD.

For this purpose, the IEEE 802.3af Draft requires that each PD include a "signature element", that is a circuit across two power input connections of the PD having predefined impedance characteristics.

When the PSE is powered up, or when a new terminal is added to the LAN, the PSE performs a link interrogation routine in order to detect the presence of such a signature element. During the interrogation phase, the functional circuits of the PD (other than the signature element) are isolated from the power supply line by a switch. Upon a positive result of the interrogation, the isolating switch of the PD is closed, and the PSE begins to supply power to the remotely connected PD. The interrogation routine employs low-voltage signals in order to avoid damaging legacy equipment that may be connected to the LAN line instead of a PD.

Once the PSE has begun to supply power to a PD, it may also be able to detect when the PD is disconnected from the LAN, in order to avoid having a high DC voltage on an open line of the LAN.

For this purpose, the IEEE 802.3af Draft specifies that the PSE should sense the DC current that is absorbed by the PD or monitor its impedance. If the current drawn from a given output port of the PSE drops below a predetermined threshold, or its impedance rises above a predetermined value, for longer than a certain period of time, the PSE cut off the DC output supply voltage to that port. Such a PD disconnection detection ability overcomes the problem that could be created in the LAN by leaving a relatively high DC voltage on an open line, and reduces the risk of damaging legacy equipment in the event that it is connected in place of the disconnected PD.

The U.S. Pat. No. 6,986,071 discloses a power distribution subsystem (typically a PSE) configured to supply DC power over a LAN to client terminals connected to the LAN. The power distribution subsystem comprises a signal generator, in parallel with the DC power source, which adds a periodic, time-varying signal to the DC voltage that it supplies through the LAN.

A control unit monitors the time-varying voltage component of the PSE output, in order to determine whether a client terminal is connected to the output and to detect disconnection when it occurs. The magnitude and phase of the time-varying voltage at the PSE output are functions of the output impedance of the power distribution system itself, and of the load impedance of the client terminal receiving power from the subsystem.

If the client terminal is disconnected, the time-varying voltage level across the output impedance of the power distribution system changes sharply, enabling the system to immediately detect the disconnection.

Supplying a time-varying voltage on the DC power lines is particularly helpful for detecting disconnection of PDs being powered (that is after the relative interrogation phase has been completed), as well as changes in the operating state of the powered devices. Preferably, a controller of the power distribution subsystem measures the time-varying voltage signal across each power output port of the subsystem and controls the DC power distribution accordingly.

The previous approaches are implemented on the high side node, forcing an integrated solution to use a charge pump to generate an extra biasing level, above the master DC power supply, or they require extra components to build up a separate signal generator or a disconnection detector circuitry not integrated with the integrated PSE controller.

SUMMARY OF THE INVENTION

A method and a circuit are for monitoring the powering of a remote device through a LAN that may not use an extra biasing voltage higher than the DC power supply voltage.

The DC voltage used for supplying the remote device is applied to the LAN line, and, at the same time, an AC voltage is applied to the line for monitoring whether or not the remote device is connected to the LAN line. Differently from prior techniques, the DC voltage is applied to a first or "high" terminal, and the AC voltage is applied to the other or "low" terminal of the LAN line through a decoupling capacitor. This arrangement makes it possible to supply the remote device with a large DC voltage compatible with a fully integrated AC signal generator, disconnection detector, and PSE controller, and enhances the reliability of recognition of whether the powered device is connected to or disconnected from the LAN line.

In fact, when the remote device is disconnected, the AC voltage charges the decoupling capacitor, thus it is possible to effectively discriminate whether the remote device is connected or not by monitoring the voltage present on the decoupling capacitor.

This method may be implemented with a circuit that does not use additional electronic components of significant area occupancy.

DETAILED DESCRIPTION OF THE PREFERRED EMBODIMENTS

Figure 1:
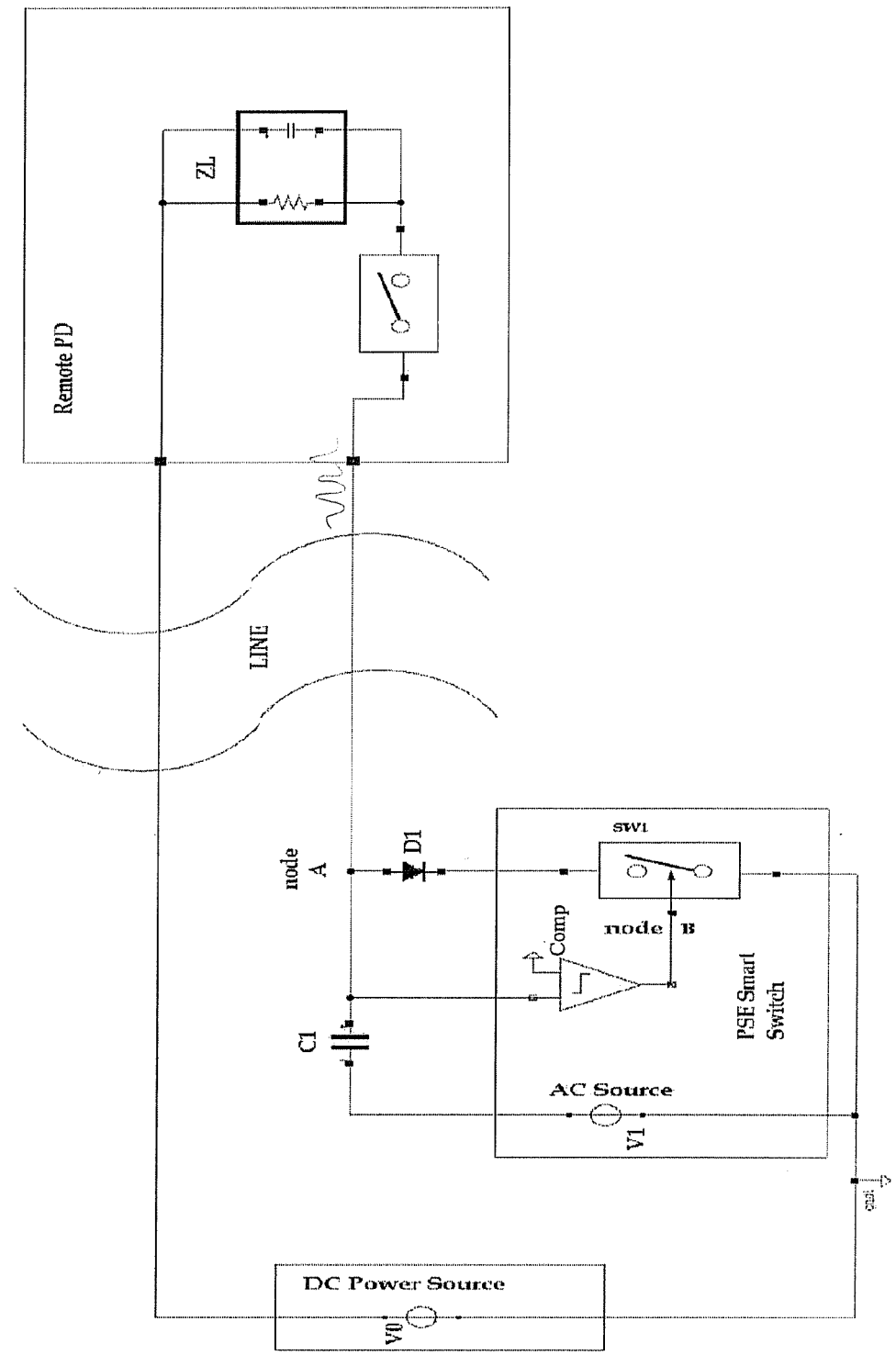
FIG. 1 shows the basic circuit of this invention for controlling the powering of a remote device with a DC voltage through a LAN line.

An embodiment of the circuit of this invention for monitoring the powering of a remote device with a DC voltage through a LAN line is depicted in FIG. 1.

An advantage of this circuit is the fact that most of the components are present to implement other functionalities, as will be immediately recognized by the skilled person.

According to prior techniques, the voltage that can be applied on the power supply conductor pair of a LAN line is limited to Vmax-Vcp, wherein Vcp is the voltage that is needed for the charge pump that generates the AC voltage and Vmax is an absolute maximum threshold rating of the controller.

By contrast, if the device is fabricated with a technology supporting a Vmax of, for example, 90V, the DC supply lines may be driven with up to 90V. In other words, the voltage allowed on the line may be equal to Vmax 90V.

A convenient way to probe the power supply line with an AC sinusoid in order to detect the absence of a connected (current absorbing) PD includes applying a low frequency sinusoidal signal. The use of a low frequency signal is convenient because, in this way, noise harmonics injected into the line and radiated are reduced when a PD is connected to the LAN line.

Figure 2:
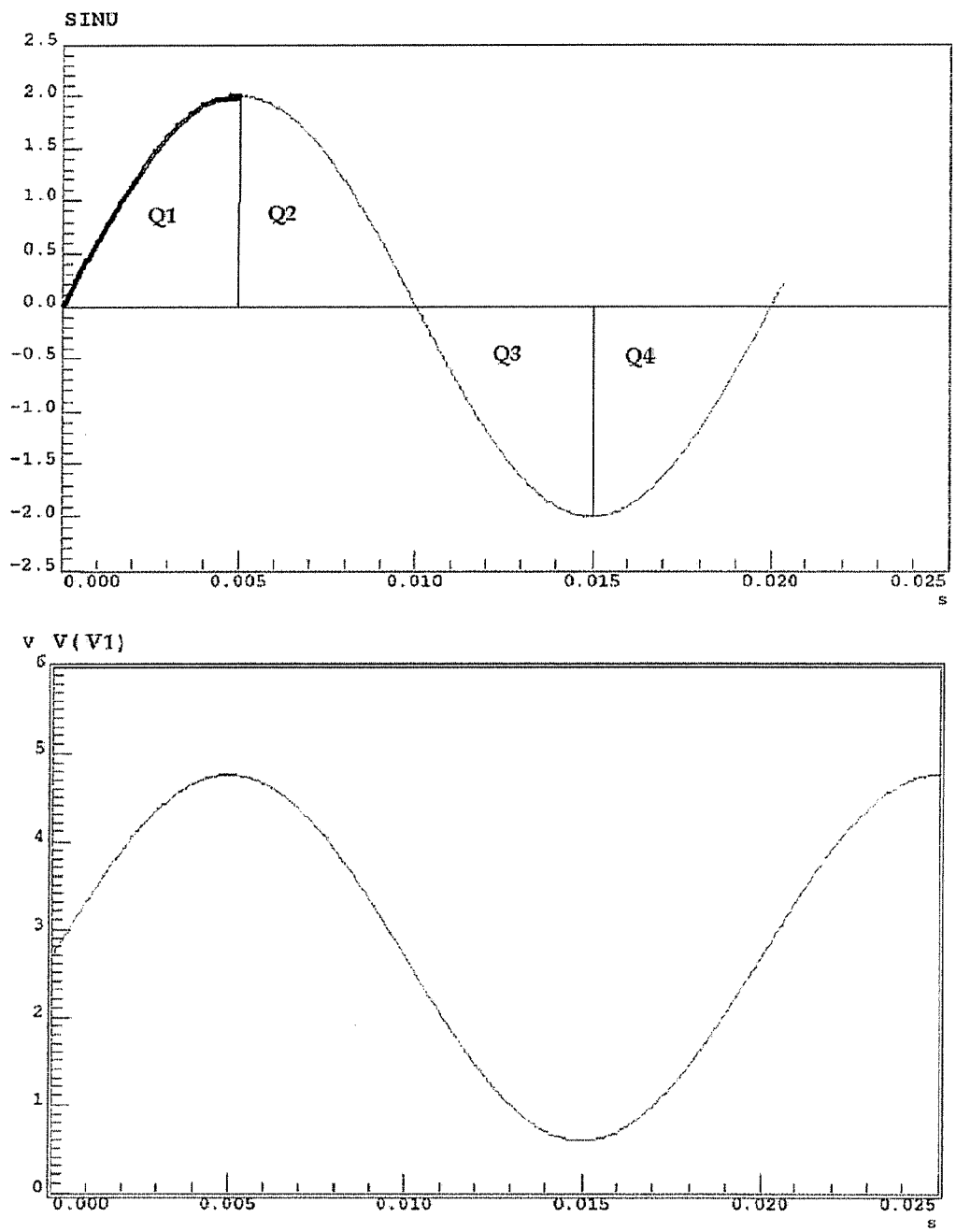
FIG. 2 depicts a non-negative sinusoidal voltage as generated by the AC generator depicted in FIG. 1.

The sinusoidal signal is generated by an AC generator which can be implemented with a digital-to-analog converter, the inputs of which are provided by a digital core circuitry taking advantage of the fact that a sinusoid can be de-composed into four symmetrical quarters Q1, Q2, Q3 and Q4, provided to the DAC with the proper sign and phase, as shown in FIG. 2.

The voltage levels provided during Q2 are the same as those in Q1 but in reverse order; the levels in Q3 have the same amplitude as those in Q1 but opposite sign and those in Q4 are those in Q1 in reverse order and opposite sign.

The DAC can autonomously add an arbitrary DC shift for keeping the signal above ground voltage. This is particularly convenient in an integrated circuit because it allows the easy integration of the signal generator, thereby relaxing the constraints of the analog design process. Moreover, the DC shift may be arbitrary and may not affect the ability to detect a disconnection.

The sinusoid is fed to the low side terminal of the power supply conduction pairs (node A in FIG. 1) through a decoupling capacitive impedance C1.

A diode and a controlled switch are also present. The diode D1 and the "smart" switch SW1 provide a power path (with current limitation and other common power feeding utilities) for the DC current (if any). The controlled switch SW1 is operated by circuitry (in the example shown in FIG. 1 a comparator COMP) capable of detecting below ground voltages.

When a PD is connected to the LAN line, its low impedance, together with C1, behaves as a capacitive voltage divider and the remaining AC voltage on node A is almost negligible (few mVpp). If a PD is disconnected or the PD takes a high impedance state, the AC signal on node A suddenly increases and the capacitor C1 charges itself to shift the signal below ground voltage and rebalance the two circuit it belongs to, namely a mesh including V0, Z1, C1, V1, and a mesh composed of V1, C1, D1, SW1.

Practically, comparing the voltage on the node A with a below ground threshold the circuit reliably detects such a disconnection situation.

In the sample embodiment of FIG. 1, a peak threshold detector is used. The peak detector has an internal circuit that exploits a knowledge of the period of the AC signal for rejecting spurious events.

According to this disclosure, there are other possible mechanisms that may be employed for deciding when the DC supply voltage should cease to be supplied to the PD. For example, it is even possible to rectify the signal on the node A and filter it in order to compare its RMS with a threshold.

Once a disconnection is detected, the controlled switch SW1 is opened, thus interrupting the DC power path.

Figure 3:
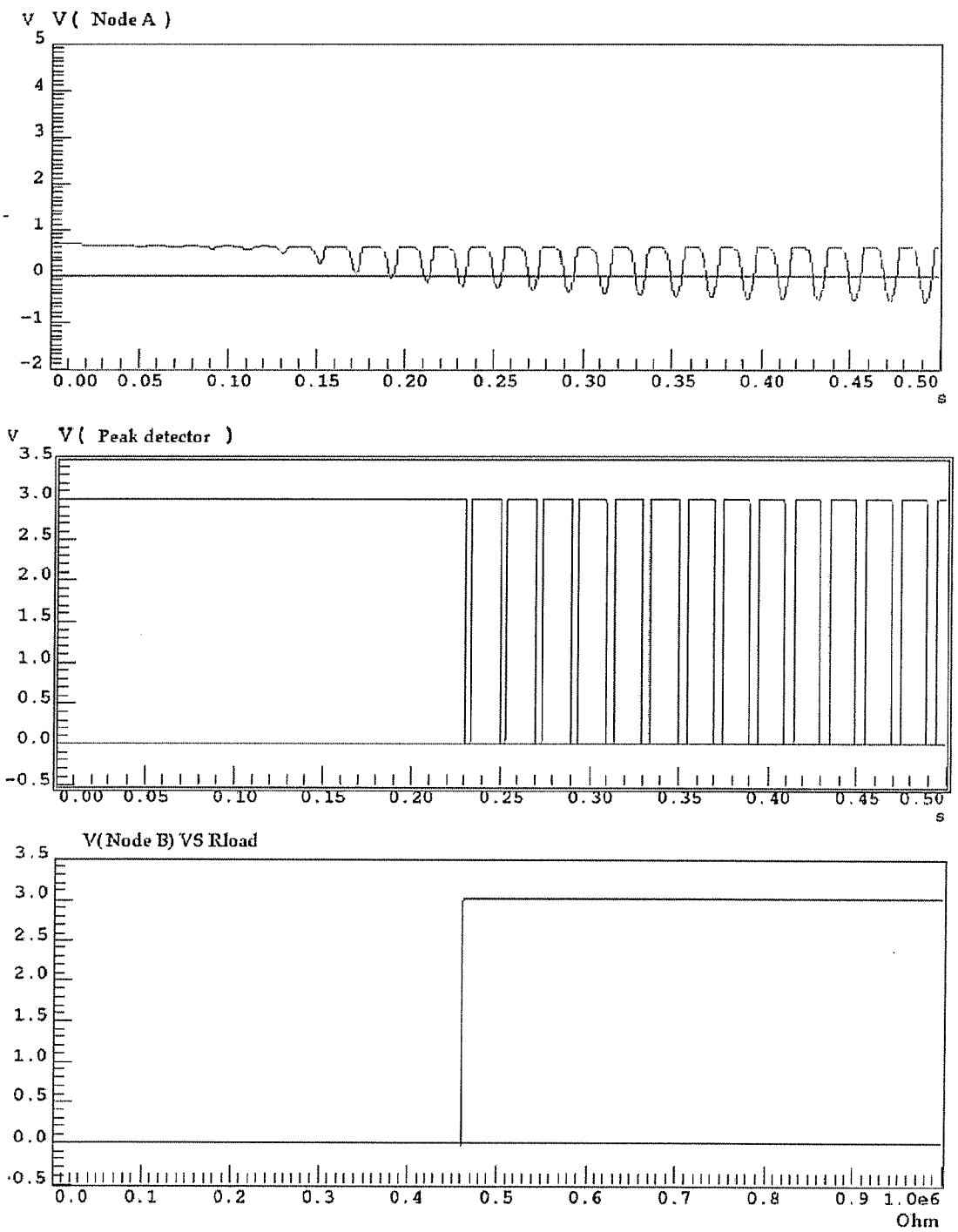
FIGS. 3 and 4 depict waveforms of the main signals of the circuit of FIG. 1, for the case of a pure resistive and for the case of a pure capacitive remote device powered through a LAN line.
Figure 4:
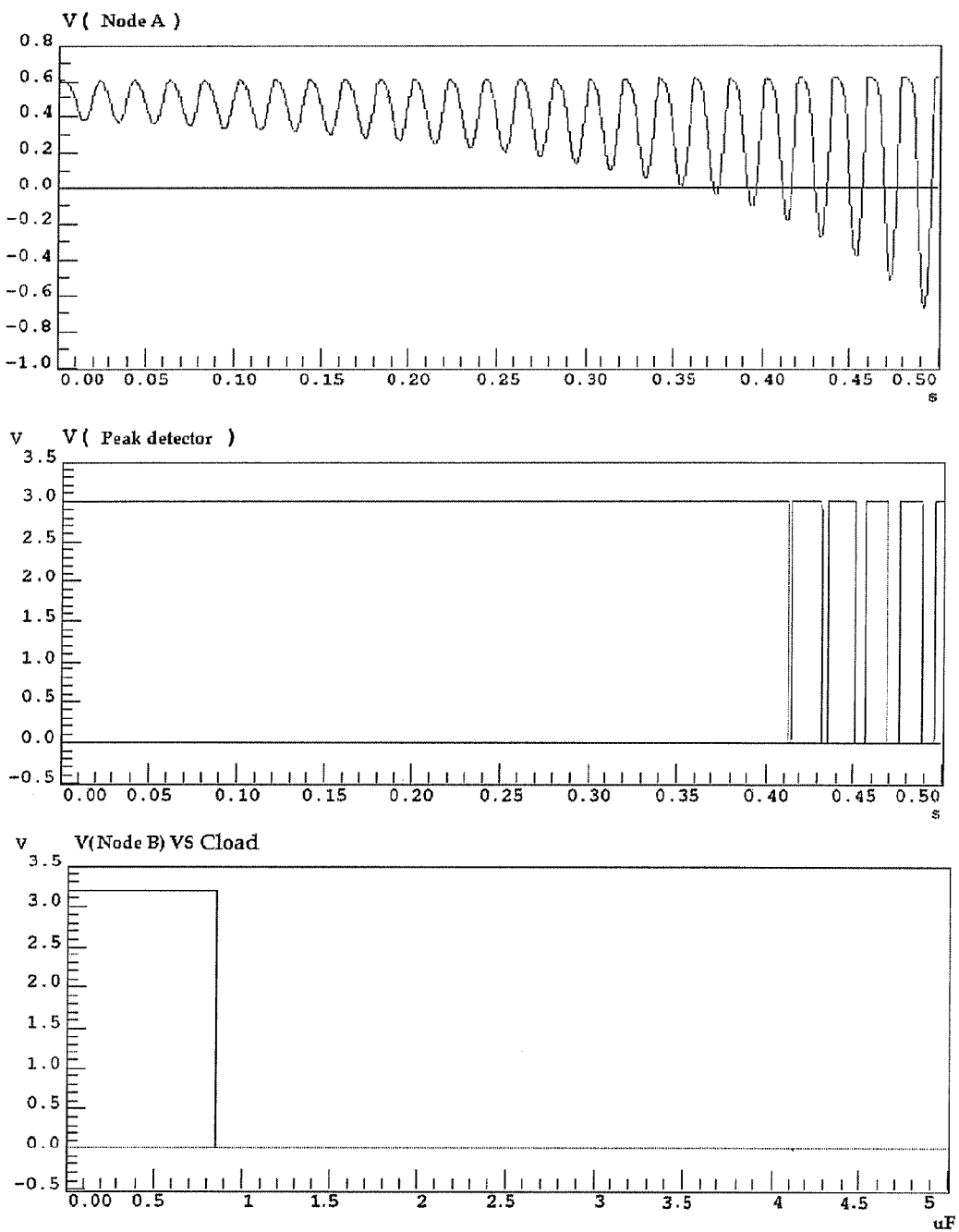

FIGS. 3 and 4 depict waveforms obtained through simulations with a pure resistive (FIG. 3) and with a pure capacitive (FIG. 4) PD load. The simulations have been carried out by changing linearly the PD load: in FIG. 3 a pure resistive load switches from 0 up to 1 MOhm; in FIG. 4 a pure capacitive load switches from 5 µF down to a practically null capacitance.

Both figures show how the signal is shifted to a below ground level in response to the respective load variation. The graphs of the peak detector output (that is high when an under-threshold voltage is detected), of the voltage on the nodes B, VS and of the PD load show that when the PD load exceeds a threshold, the circuit of this invention detects such a situation (the voltage on the node B is high if the impedance Zload of the load is high).

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and additional embodiments are intended to be included within the scope of the appended claims.

That which is claimed is:

1. A method of monitoring powering of a device through a local area network (LAN) connection comprising:
    applying a time-varying voltage to a second terminal of the LAN connection through a de-coupling capacitor while powering the device by applying a DC voltage to a first terminal of the device, with the time-varying voltage and the de-coupling capacitor being connected in series, with a diode having an anode terminal coupled between the de-coupling capacitor and the second terminal, and having a cathode terminal;
    sensing a time-varying voltage on the second terminal caused by the applied time-varying voltage; and
    continuing powering of the device with the DC voltage based upon at least one electric parameter of the sensed time-varying voltage via a switch coupled in parallel to the de-coupling capacitor and the time-varying voltage generator when the switch is in a closed position, with the switch being operated based on a below ground voltage being detected at the anode terminal of the diode.

2. The method of claim 1, wherein the applied time-varying voltage is non-negative.

3. The method of claim 1, further comprising comparing an amplitude of the sensed time-varying voltage with a threshold voltage, and operating the switch to stop powering of the device with the DC voltage when the threshold voltage is exceeded.

4. The method of claim 1, further comprising comparing a root mean square of the sensed time-varying voltage with a threshold voltage, and operating the switch to stop powering of the device with the DC voltage when the threshold voltage is exceeded.

5. The method of claim 1, wherein the applied time-varying voltage is a sinusoidal voltage.

6. A method of monitoring powering of a device through a local area network (LAN) connection comprising:
   applying a non-negative time-varying voltage to a second terminal of the LAN connection through a de-coupling capacitor while powering the device by applying a DC voltage to a first terminal of the device, with the non-negative time-varying voltage and the de-coupling capacitor being connected in series, with a diode having an anode terminal coupled between the de-coupling capacitor and the second terminal, and having a cathode terminal;
   sensing a time-varying voltage on the second terminal caused by the applied non-negative time-varying voltage;
   continuing powering of the device with the DC voltage based upon at least one electric parameter of the sensed time-varying voltage; and
   comparing an amplitude of the sensed time-varying voltage with a threshold voltage, and stopping powering of the device with the DC voltage when the threshold voltage is exceeded via a switch coupled in parallel to the de-coupling capacitor and the non-negative time-varying voltage when the switch is in a closed position, with the switch being operated based on a below ground voltage being detected at the anode terminal of the diode.

7. The method of claim 6, further comprising comparing a root mean square of the sensed time-varying voltage with a threshold voltage, and operating the switch to stop powering of the device with the DC voltage when the threshold voltage is exceeded.

8. The method of claim 6, wherein the applied time-varying voltage is a sinusoidal voltage.

9. A circuit for generating a flag signal indicative of whether a device is powerable through a local area network (LAN) having first and second terminals comprising:
   a DC voltage generator configured to apply a DC voltage to the first terminal;
   a time-varying voltage generator coupled with said DC voltage generator;
   a decoupling capacitor to couple the time-varying voltage generator to the second terminal of the LAN, with said decoupling capacitor being coupled in series with said time-varying generator;
   a diode having an anode terminal coupled between said de-coupling capacitor and the second terminal, and a cathode terminal;
   a comparator configured to compare a sensed time-varying voltage on the second terminal with a threshold and to generate a flag based thereupon; and
   a switch coupled in parallel to said de-coupling capacitor and said time-varying voltage generator when in a closed position and configured to ground the second terminal based upon the flag, with said switch being operated based on a below ground voltage being detected at the anode terminal of said diode.

10. The circuit of claim 9, wherein said switch comprises a unidirectional switch.

11. The circuit of claim 9, wherein a capacitance of said decoupling capacitor is greater than a capacitance of the device.

12. The circuit of claim 9, wherein the time-varying voltage generator generates a sinusoidal voltage.

13. A circuit for monitoring powering of a device through a local area network (LAN) connection having first and second terminals comprising:
   a voltage generator coupled in series to a de-coupling capacitor and configured to apply a time-varying voltage to the second terminal via the de-coupling capacitor;
   a DC voltage generator coupled with said voltage generator and configured to power the device with a positive DC voltage applied to the first terminal while the voltage generator applies the time-varying voltage to the second terminal;
   a diode having an anode terminal coupled between said de-coupling capacitor and the second terminal, and a cathode terminal;
   a comparator configured to sense a time-varying voltage on the second terminal; and
   a switch coupled in parallel to said de-coupling capacitor and said time-varying voltage generator when in a closed position and configured to continue powering of the device by the DC voltage based upon at least one electric parameter of the sensed time-varying voltage, with the switch being operated based on a below ground voltage being detected at the anode terminal of the diode.

14. The circuit of claim 13, wherein the applied time-varying voltage is non-negative.

15. The circuit of claim 13, wherein said comparator is further configured to compare an amplitude of the sensed time-varying voltage with a threshold voltage; and wherein said switch is further configured to stop powering of the device by said DC voltage generator when the threshold voltage is exceeded.

16. The circuit of claim 13, wherein said comparator is further configured to compare a root mean square of the sensed time-varying voltage with a threshold voltage; and wherein said switch is further configured to stop powering of the device by said DC voltage generator when the threshold voltage is exceeded.

17. The circuit of claim 13, wherein the time-varying voltage is a sinusoidal voltage.

* * * * *